United States Patent
Katsukura et al.

(10) Patent No.: US 9,122,473 B2
(45) Date of Patent: Sep. 1, 2015

(54) PROGRAM GENERATING DEVICE, PROGRAM GENERATING PROGRAM, AND PROGRAM GENERATING METHOD

(75) Inventors: Makoto Katsukura, Tokyo (JP); Masanori Nakata, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 149 days.

(21) Appl. No.: 13/885,223

(22) PCT Filed: Jan. 26, 2011

(86) PCT No.: PCT/JP2011/051510
§ 371 (c)(1),
(2), (4) Date: May 14, 2013

(87) PCT Pub. No.: WO2012/070254
PCT Pub. Date: May 31, 2012

(65) Prior Publication Data
US 2013/0232467 A1  Sep. 5, 2013

(30) Foreign Application Priority Data
Nov. 26, 2010 (JP) ................................ 2010-263519

(51) Int. Cl.
G06F 9/44 (2006.01)
G06F 11/30 (2006.01)
G06F 11/32 (2006.01)

(52) U.S. Cl.
CPC .............. *G06F 8/30* (2013.01); *G06F 11/3013* (2013.01); *G06F 11/3017* (2013.01); *G06F 11/3055* (2013.01); *G06F 11/3079* (2013.01); *G06F 11/32* (2013.01)

(58) Field of Classification Search
None
See application file for complete search history.

(56) References Cited

U.S. PATENT DOCUMENTS 5,121,501 A * 6/1992 Baumgartner et al. ....... 717/130
5,822,588 A * 10/1998 Sterling et al. ................ 717/131
(Continued)

FOREIGN PATENT DOCUMENTS

CN  101425121 A  5/2009
JP  07-006058 A  1/1995
(Continued)

OTHER PUBLICATIONS

Harel, et al., "Model-Checking Behavioral Programs"; 2011 ACM; [retrieved on May 7, 2015]; Retrieved from Internet<URL:http://dl.acm.org/citation.cfm?id=2038642.2038686>;pp. 279-288.*
(Continued)

*Primary Examiner* — Xi D Chen
(74) *Attorney, Agent, or Firm* — Posz Law Group, PLC

(57) ABSTRACT

A terminal device that is this program generating device generates program area specifying information that specifies the placement area of an operating program executed by a remote control device. Also, on the basis of the program area specifying information and a program counter value of the remote control device, the terminal device appends a program specifying process that specifies the operating program executed by the remote control device to a measuring program that measures the execution state of the operating program. As a result, there is generated a measuring program that measures changes in the operating state of software in real time while reducing the effect on the operation of the software.

9 Claims, 12 Drawing Sheets

(56) References Cited

U.S. PATENT DOCUMENTS

| | | | |
|---|---|---|---|
| 6,810,247 B1* | 10/2004 | Halpern | 717/131 |
| 6,954,924 B2* | 10/2005 | Degenaro et al. | 717/131 |
| 7,392,307 B2* | 6/2008 | Motoyama et al. | 717/127 |
| 7,516,443 B2* | 4/2009 | Creamer et al. | 717/127 |
| 7,716,652 B2* | 5/2010 | Smith et al. | 717/130 |
| 7,810,074 B2* | 10/2010 | Yano et al. | 717/131 |
| 7,861,225 B2* | 12/2010 | Lee | 717/127 |
| 8,527,814 B1* | 9/2013 | Elwell et al. | 717/131 |
| 8,756,586 B2* | 6/2014 | Khanapurkar et al. | 717/130 |
| 8,832,656 B2* | 9/2014 | Dahms et al. | 717/127 |
| 9,021,443 B1* | 4/2015 | Lachwani et al. | 717/127 |
| 2002/0035708 A1* | 3/2002 | Ishida et al. | 714/25 |
| 2002/0038439 A1* | 3/2002 | Sato | 714/724 |
| 2003/0056201 A1* | 3/2003 | Degenaro et al. | 717/130 |
| 2008/0040708 A1* | 2/2008 | Blancha et al. | 717/130 |

FOREIGN PATENT DOCUMENTS

| | | | |
|---|---|---|---|
| JP | 07-021036 A | 1/1995 | |
| JP | 2002-351695 A | 12/2002 | |
| JP | 2009-157751 A | 7/2009 | |
| JP | 2009-245151 A | 10/2009 | |

OTHER PUBLICATIONS

Hari, et al., "GangES: Gang Error Simulation for Hardware Resiliency Evaluation"; 2014, IEEE; [retrieved on May 7, 2015]; Retrieved from Internet<URL:http://dl.acm.org/citation.cfm?id=2665671.2665685>;pp. 279-288.*

Lall, et al., "Statistical Pattern Recognition and Built-in Reliability Test for Feature Extraction and Health Monitoring of Electronics under Shck Loads"; 2007 IEEE; [retrieved on May 7, 2015]; Retrieved from Internet<URL:http://ieeexplore.ieee.org/stamp/stamp.jsp?tp=&arnumber=4250028>;pp. 1161-1178.*

Guazzoni, et al., "Proposed Object-Oriented Architecture of a Flexible Small-Scale System for Digital Pulse Shape Acquisition", 2006, IEEE; [retrieved on May 7, 2015]; Retrieved from Internet<URL:http://ieeexplore.ieee.org/stamp/stamp.jsp?tp=&arnumber=1644959>;pp. 886-892.*

International Search Report of the International Searching Authority mailed Apr. 12, 2011 for the corresponding international application No. PCT/JP2011/051510 (with English translation).

Office Action issued on Dec. 3, 2014 in the corresponding Chinese Application No. 201180056552.9 (and partial English translation).

* cited by examiner

| COMMAND NAME | COMMAND PART | DATA PART |
|---|---|---|
| TASK START COMMAND | 0x01 | TASK ID |
| TASK END COMMAND | 0x02 | TASK ID |
| PROGRAM START COMMAND | 0x03 | PROGRAM ID |
| PROGRAM END COMMAND | 0x04 | PROGRAM ID |

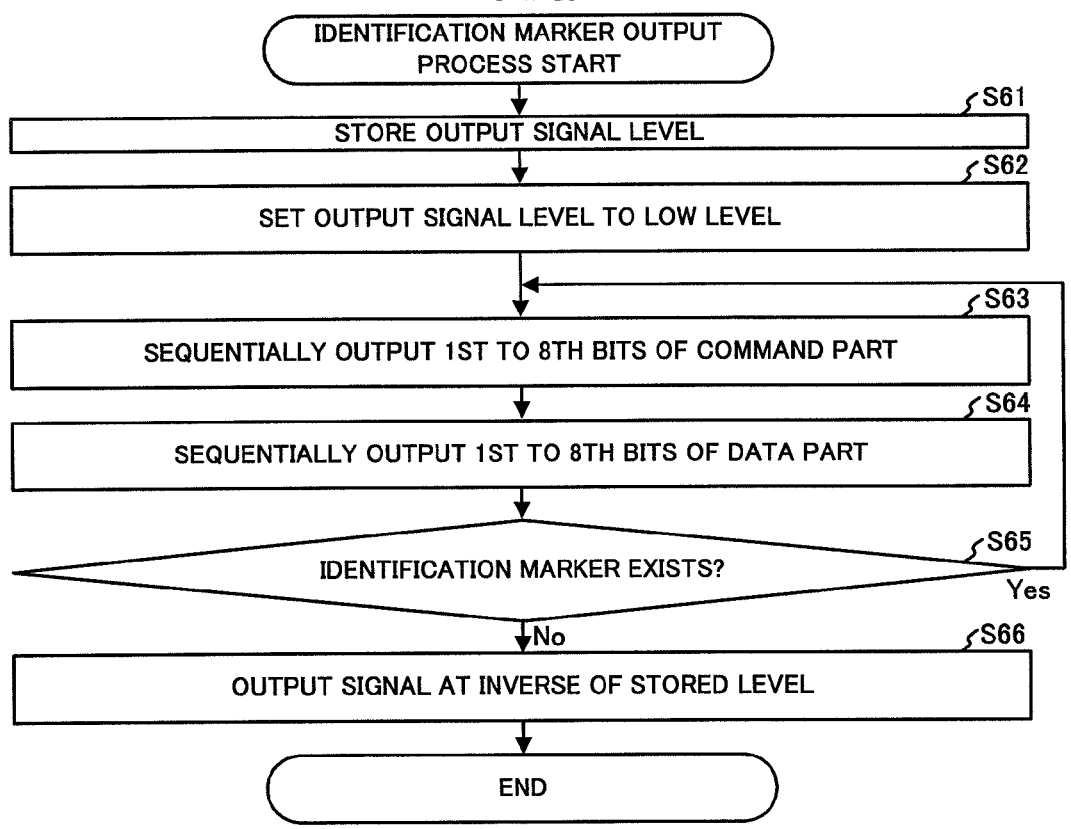

PROGRAM GENERATING DEVICE, PROGRAM GENERATING PROGRAM, AND PROGRAM GENERATING METHOD

CROSS REFERENCE TO RELATED APPLICATIONS

This application is a U.S. national stage application of PCT/JP2011/051510 filed on Jan. 26, 2011, and claims priority to, and incorporates by reference, Japanese Patent Application No. 2010-263519 filed on Nov. 26, 2010.

TECHNICAL FIELD

The present invention relates to a program generating device, a program generating program, and a program generating method, and more particularly, to a program generating device, a program generating program, and a program generating method that generate a measuring program that measures the execution state of an operating program by a controller that controls equipment.

BACKGROUND ART

There has been proposed a software development support device able to extract mutually exclusive state transition parameters from among multiple state transition parameters that the software satisfies when changing the operating state of the software to another operating state (see PTL 1, for example).

CITATION LIST

Patent Literature

PTL 1: Unexamined Japanese Patent Application Kokai Publication No. 2009-157751

SUMMARY OF INVENTION

Technical Problem

However, with the technology disclosed in PTL 1, there is a problem of being unable to generate a measuring program able to measure changes in the operating state of the software in real time while reducing the effect on the operation of the software.

The present invention, having been devised under the above circumstances, takes as an object to provide a program generating device, a program generating program, and a program generating method able to generate a measuring program that measures changes in the operating state of software in real time while reducing the effect on the operation of the software.

Solution to Problem

In order to achieve the above object, a program generating device of the present invention is provided with information generating means for generating program area specifying information that specifies the placement area of an operating program executed by a controller that controls equipment, and measuring process adding means for adding a program specifying process that specifies the operating program executed by the controller, on the basis of the program area specifying information generated by the information generating means and a program counter value of the controller, and an identification information transmitting process that transmits identification information identifying the specified operating program to a measuring program that measures the execution state of the operating program.

Advantageous Effects of Invention

A program generating device, a program generating program, and a program generating method in accordance with the present invention enable the generation of a measuring program that measures changes in the operating state of software in real time while reducing the effect on the operation of the software.

BRIEF DESCRIPTION OF DRAWINGS

FIG. 10 is a flowchart illustrating an example of an identification marker outputting process executed by a remote control device;

DESCRIPTION OF EMBODIMENTS

Hereinafter, an execution state measuring system 1 in accordance with an embodiment of the present invention will be described with reference to the attached drawings.

Figure 1:
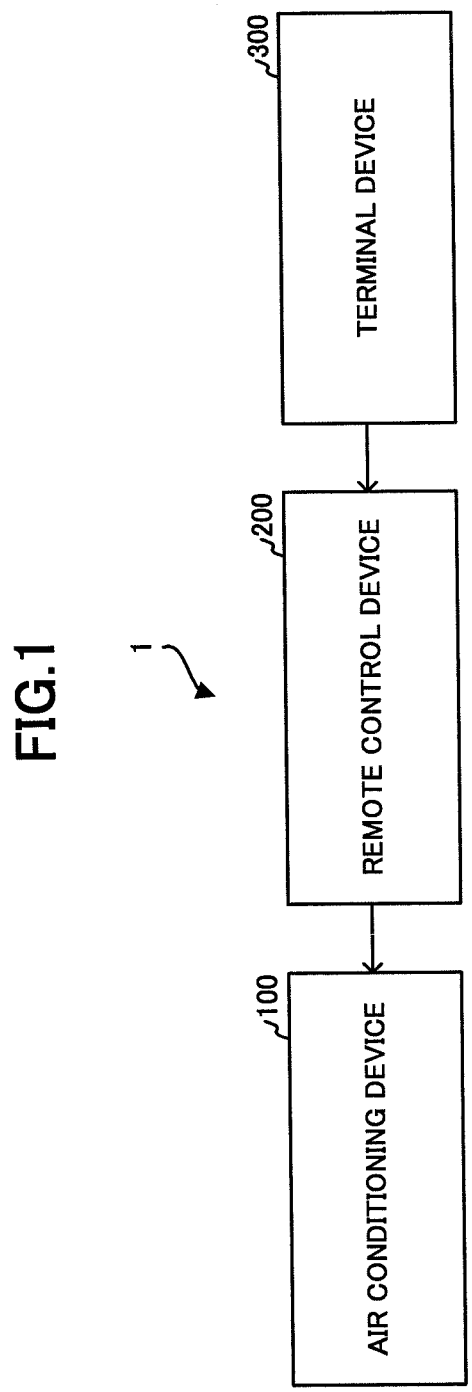
FIG. 1 is a configuration diagram illustrating an example of an execution state measuring system in accordance with an embodiment of the present invention.

As illustrated in FIG. 1, the execution state measuring system 1 in accordance with an embodiment of the present invention includes an air conditioning device 100, a remote control device (hereinafter referred to as a remote) 200, and a terminal device 300. The air conditioning device 100 includes an air conditioner (or AC) installed inside a building, and an AC outdoor section. The remote 200 is installed on the wall of a building or home, for example, and connects to the air conditioning device 100 via a signal line. The remote 200 controls state quantities set by the air conditioning device 100, such as a set temperature and indoor temperature, the airflow rate and airflow speed by the air conditioning device 100, as well as the operating mode, for example. Note that the remote 200 may also control multiple air conditioning devices.

The terminal device 300 is a program generating device in accordance with the present invention. The terminal device 300 is configured as a personal computer, for example, and generates an operating program that calls a measuring program (the measuring program is embedded).

An operating program herein refers to a program which is executed in the remote 200 and which is used for the operation of the remote 200, including control of the operation of the air conditioning device 100. Specifically, the operating program includes a communication program that communicates with the air conditioning device 100, a control program that controls operation of the air conditioning device 100 by communication, and a display program that displays information such as communication results, control results, and operating state quantities of the air conditioning device 100. The communication program, the control program, and the display program must be executed concurrently (or in other words, in parallel) in the remote 200, and instantaneous (real time) performance is demanded. For this reason, suspending the execution of any one or more of these programs (in other words, the communication program, the control program, and the display program) in order to measure the execution state of the operating program is difficult. Also, since these programs are executed in parallel, arbitrating the resources used by these programs is difficult, even when using a state transition table or the like.

A measuring program herein refers to a program that measures the execution state of the operating program embedded with the measuring program. Herein, execution states of the operating program include an execution start state in which execution of the operating program has started, a running state in which the operating program is being executed, a standby state in which execution of the operating program is on standby, and an execution end state in which execution of the operating program has ended.

Figure 2:
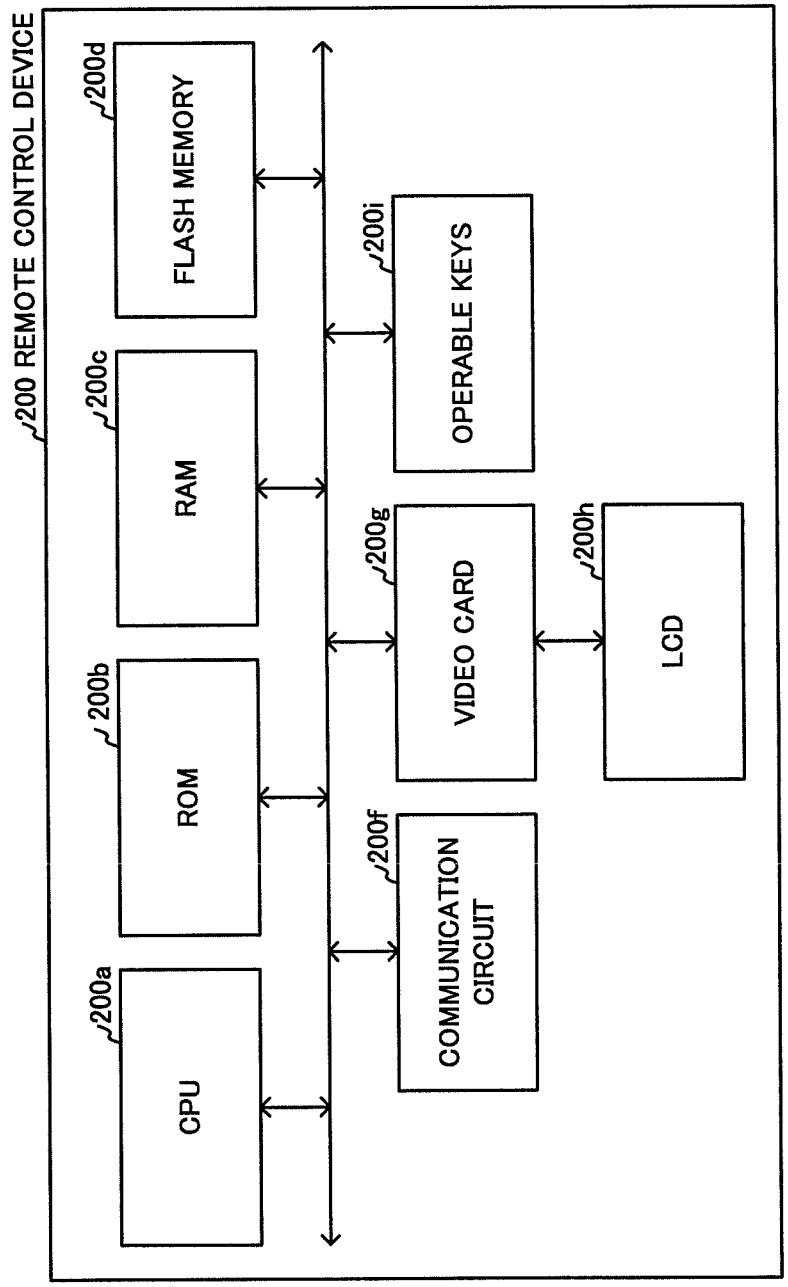
FIG. 2 is a hardware configuration diagram illustrating an exemplary configuration of a remote control device.

As illustrated in FIG. 2, the remote 200 includes a Central Processing Unit (CPU) 200a, Read-Only Memory (ROM) 200b, Random Access Memory (RAM) 200c, flash memory 200d, a communication circuit 200f, a video card 200g, a Liquid Crystal Display (LCD) 200h, and operable keys 200i.

The CPU 200a controls the remote 200 overall by executing software processing according to a program saved to the ROM 200b or the flash memory 200d. The terminal device 300 overwrites the program stored in the flash memory 200d. The RAM 200c temporarily saves information to be processed (in other words, data) while the CPU 200a is executing the program.

The communication circuit 200f transmits and receives data signals to and from the air conditioning device 100 and the terminal device 300 connected via 3-wire communication lines, for example. The operable keys 200i input signals or information according to user operations.

The video card 200g draws (in other words, renders) an image on the basis of a digital signal output from the CPU 200a, and also outputs an image signal expressing the drawn image. The LCD 200h is a display that displays an image according to an image signal output from the video card 200g. Note that the remote 200 may also be equipped with a Plasma Display Panel (PDP) or an Electroluminescence (EL) display instead of the LCD 200h.

Figure 3:
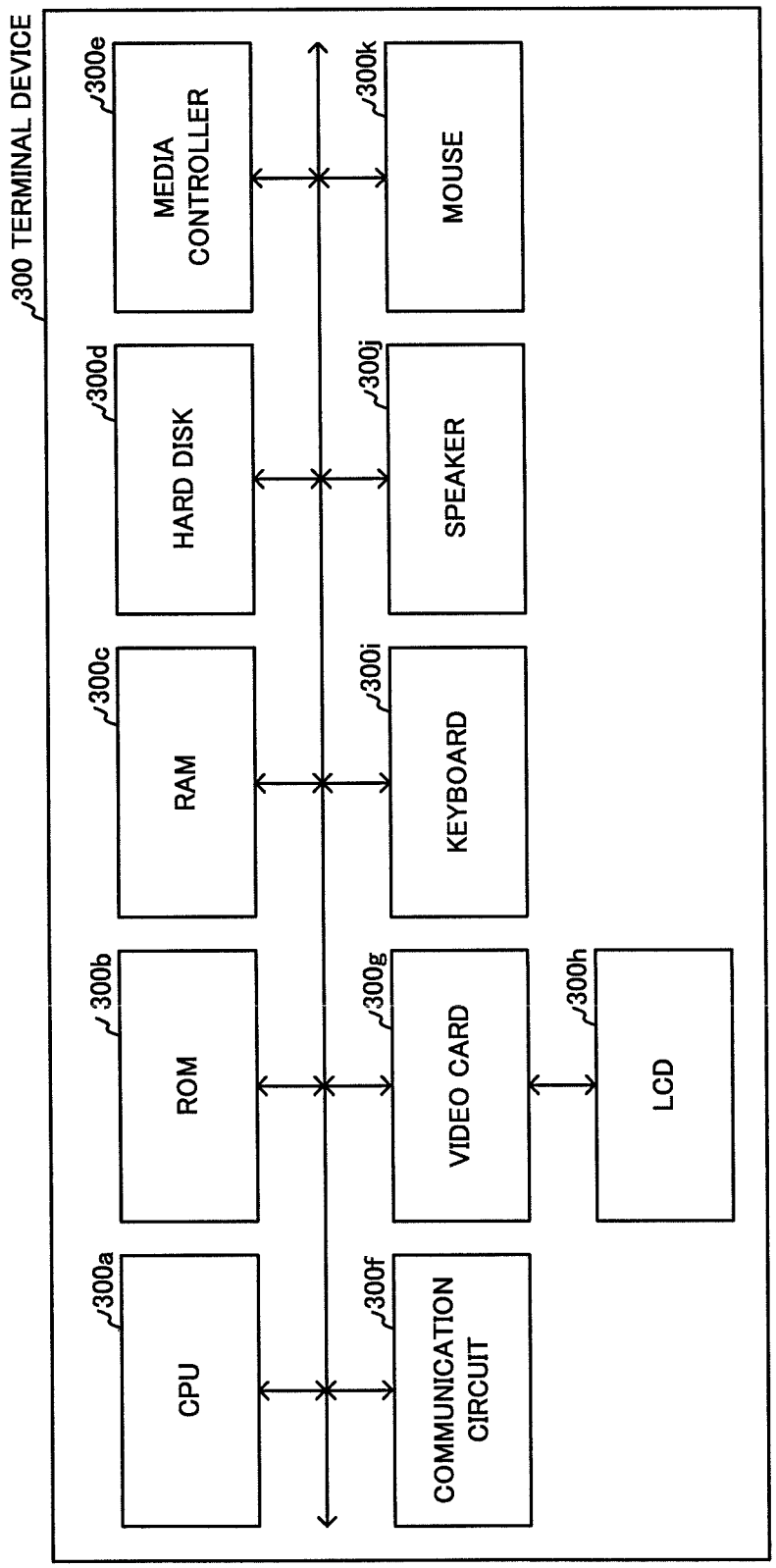
FIG. 3 is a hardware configuration diagram illustrating an exemplary configuration of a terminal device.

As illustrated in FIG. 3, the terminal device 300 includes a CPU 300a, ROM 300b, RAM 300c, a hard disk 300d, a media controller 300e, a communication circuit 300f, a video card 300g, an LCD 300h, a keyboard 300i, a speaker 300j, and a pointing device (hereinafter referred to as a mouse) 300k.

The CPU 300a controls the terminal device 300 overall by executing software processing according to a program saved to the ROM 300b or the hard disk 300d. Since the RAM 300c, the communication circuit 300f, the video card 300g, and the LCD 300h are similar to the RAM 200c, the communication circuit 200f, the video card 200g and LCD 200h, description thereof is omitted.

The hard disk 300d stores tables in which various information (in other words, data) is saved, electronic files expressing the source code of various programs (hereinafter referred to as source files), and library programs called by various programs. Included among the various source files stored in the hard disk 300d are source files for component programs which act as components of the operating program (hereinafter referred to as operating component programs), and source files for component programs which act as components of the measuring program embedded into the operating program (hereinafter referred to as measuring component programs). Note that the terminal device 300 may also be equipped with flash memory instead of the hard disk 300d.

The media controller 300e retrieves various data and programs from recording media, including flash memory, Compact Discs (CD), Digital Versatile Disc (DVD), and Blu-ray Discs (registered trademark).

The keyboard 300i and the mouse 300k input signals or information according to user operations. The speaker 300j outputs audio on the basis of a signal output from the CPU 300a.

Figure 4A:
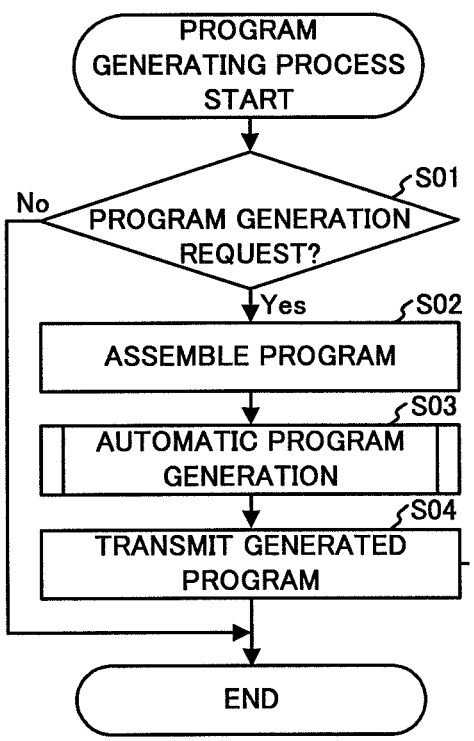
FIG. 4A is a flowchart illustrating an example of a program generating process executed by a terminal device.
Figure 5A:
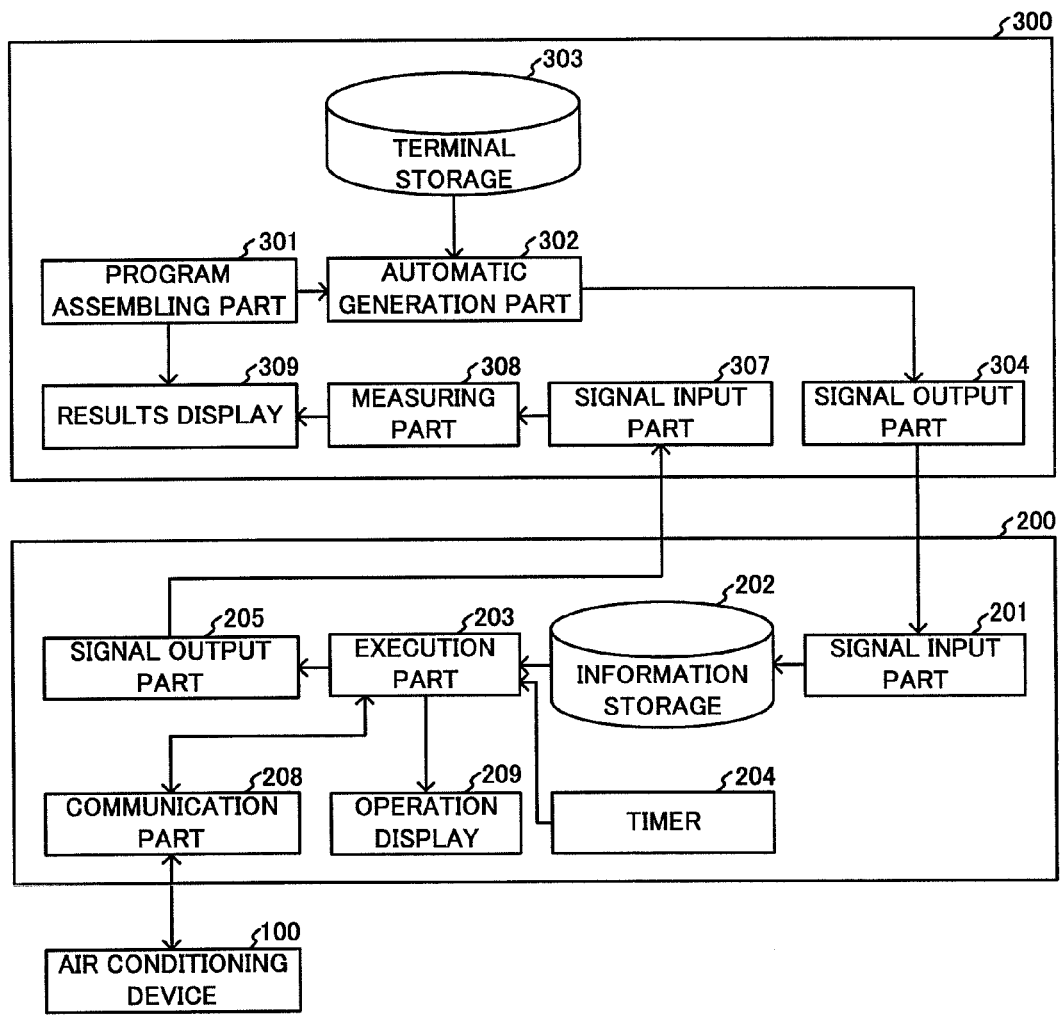
FIG. 5A is a function block diagram illustrating an example of functions included in a remote control device and functions included in a terminal device.

By having the CPU 300a of the terminal device 300 execute the program generating process in FIG. 4A using the hardware illustrated in FIG. 3, a program assembling part 301, an automatic generation part 302, terminal storage 303, a signal output part 304, and a results display 309 as illustrated in FIG. 5A are realized. Note that the automatic generation part 302 includes the measuring process adding part 302a and the information generation part 302b in FIG. 5B.

Execution of the program generating process in FIG. 4A is triggered by a timer interrupt produced at a given period or by an event occurring. When execution of the program generating process starts, the program assembling part 301 checks a signal input from an input part made up of the keyboard 300i and the mouse 300k in FIG. 3 to determine whether or not the user has issued a request to generate an operating program (hereinafter referred to as the program generation request) (step S01). At this point, the program assembling part 301 ends execution of the program generating process in the case of determining that there is no program generation request (step S01; No).

Figure 6:
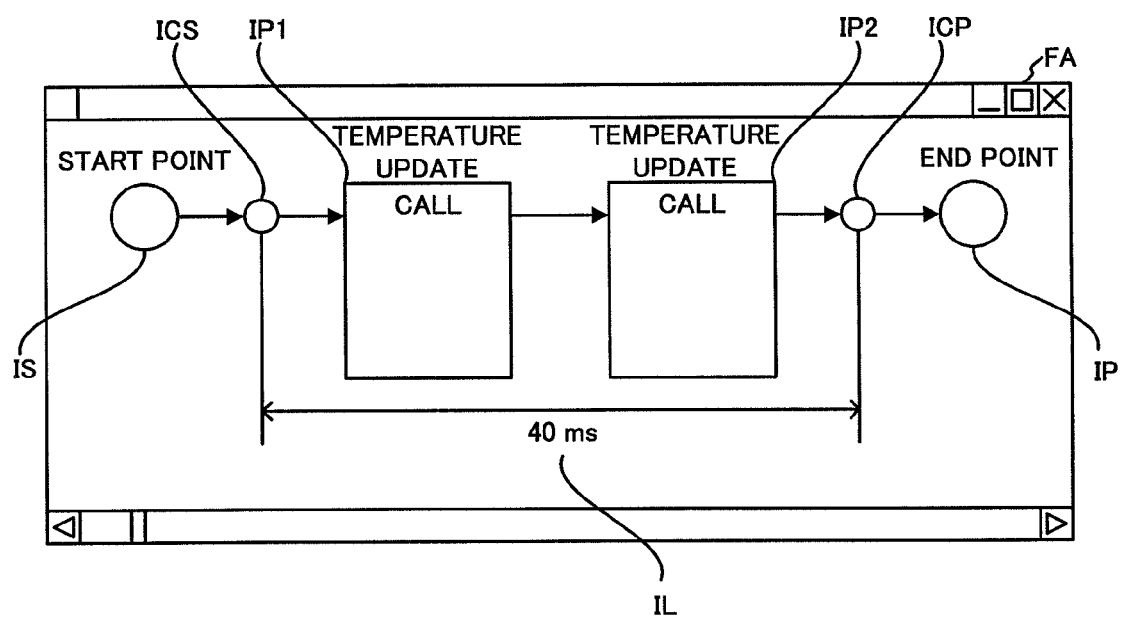
FIG. 6 is a diagram illustrating an example of a program assembly screen displayed by a terminal device.

In the case of determining in step S01 that there is a program generation request (step S01; Yes), the program assembling part 301 causes the results display 309 to display a screen FA used to assemble a program as illustrated in FIG. 6 (hereinafter referred to as the program assembly screen). After that, the program assembling part 301 assembles a program on the basis of signals input from the input part (in other words, determines factors such as the order in which to call the component programs constituting the program during execution) (step S02).

Displayed on the program assembly screen FA in FIG. 6 are a start point display IS, a program start command display ICS, component program displays IP1 and IP2, a program end command display ICP, an end point display IP, and a time constraint display IL.

The start point display IS expresses the beginning of the operating program to be generated. The program start command display ICS expresses a measuring component program that transmits a command indicating that the operating program to be generated has entered the execution start state (hereinafter referred to as the program start command). The component program displays IP1 and IP2 express operating component programs called by the operating program, for example. The program end command display ICP expresses a measuring component program that transmits a command indicating that the operating program to be generated has entered the execution end state (hereinafter referred to as the program end command). The end point display IP expresses the end of the operating program to be generated. The time constraint display IL indicates that the amount of time from the sending of the program start command to the sending of the program end command must be shorter than a time constraint. This is because real time performance is demanded from the operating program used to control the operation of the air conditioning device 100.

The component programs, including the operating component programs and the measuring component programs, are programs of small scale compared to the operating program, and are used to execute a collection of given processes. Type of processes executed using component programs include an exception process, a condition determining process, a substituting process, a saving process, and a measuring process, for example. The exception process is a process that halts execution of the component program, or the operating program or the measuring program that called the component program, in the case where a preset exception condition is satisfied. The condition determining process is a process executed in the case where a specified execution-conditional logic expression is true. The substituting process is a process that calls a specified mathematical operation or a specified function, and substitutes the return value of the called function into a specified variable. The measuring process is a process used in order to measure the execution state of the operating program. Note that the source files for these various component programs are stored in advance in the terminal storage 303 in FIG. 5A. Obviously, source files for component programs may also be newly generated by the terminal device 300 according to the operating program to be generated.

On the program assembly screen FA in FIG. 6, a program is assembled such that component programs expressed by displays positioned farther to the left side of the screen are called or executed earlier during the execution of the operating program. In other words, the program assembly screen FA is a screen displaying a visual time chart or block chart that arranges block-shaped displays expressing component programs according to the order in which the component programs are executed.

Next, a program assembly method will be described. The program assembling part 301 controls the results display 309 to display information such as the program names of component programs stored in the terminal storage 303 on the program assembly screen FA. Next, the user decides on a component program to use in assembly, on the basis of the displayed program names or other information. After t hat, the program assembling part 301 specifies the component program indicated for use in assembly by the user on the basis of a signal input from the input part, and specifies the position on the program assembly screen FA specified by the user on the basis of a signal input from the input part. Next, the program assembling part 301 controls the results display 309 to display the indicated component program at the specified position on the program assembly screen FA. According to this configuration, the user is able to easily change the call order of a component program during execution of the operating program simply by operating the input part to change the display position expressing the component program.

In addition, the program assembling part 301 specifies a time constraint imposed on the amount of time from the start to the end of the execution of the operating program (in other words, the execution time), on the basis of a signal input from the input part. After that, the program assembling part 301 controls the results display 309 to display the line segment joining the program start command display ICS to the program end command display ICP in FIG. 6 on the program assembly screen FA, and to display the time constraint at a position corresponding to the displayed line segment.

Figure 7:
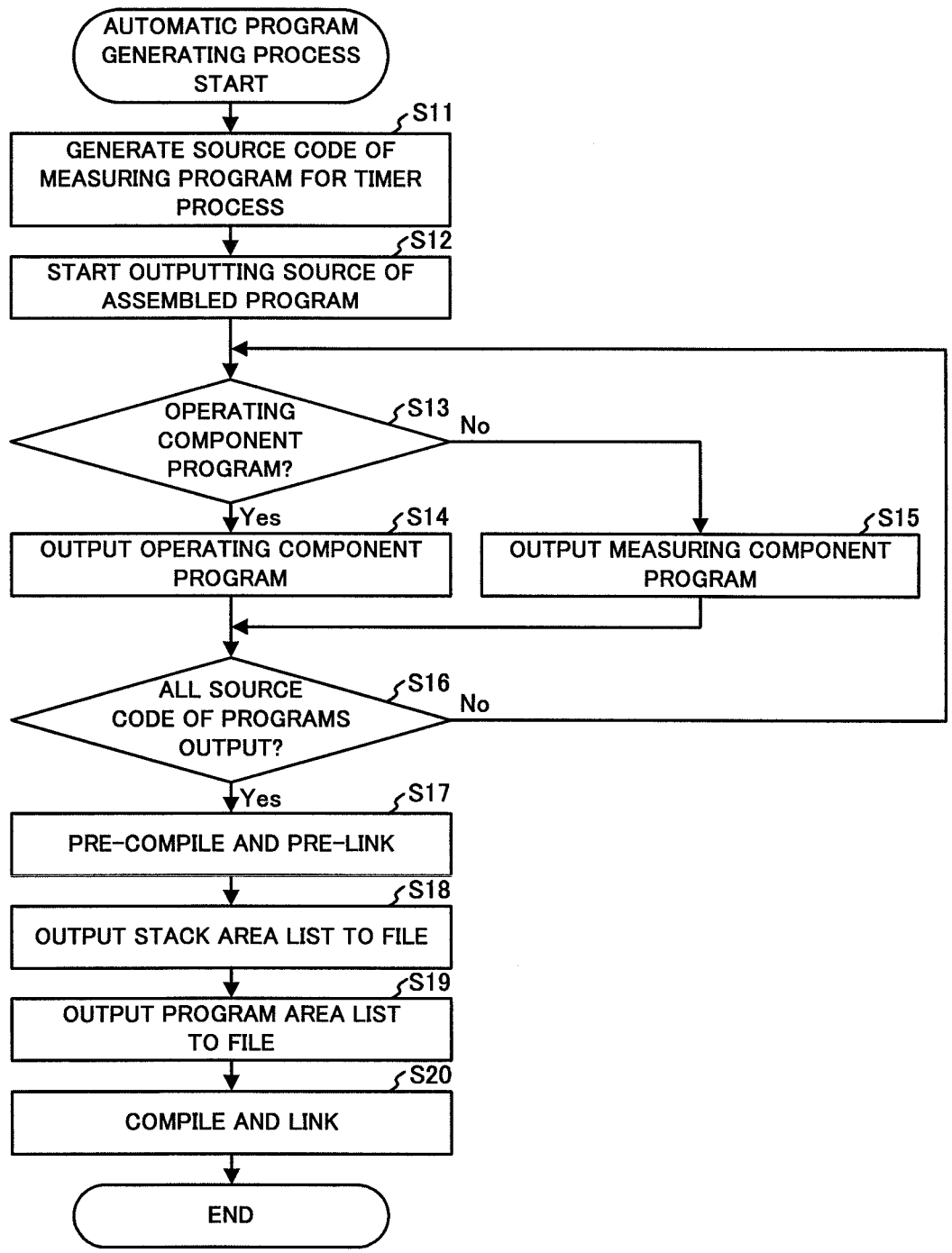
FIG. 7 is a flowchart illustrating an example of an automatic program generating process executed by a terminal device.

After executing step S02 in FIG. 4A, the automatic generation part 302 executes an automatic program generating process like that illustrated in FIG. 7, which automatically generates the program assembled in step S02 (step S03).

Figure 5B:
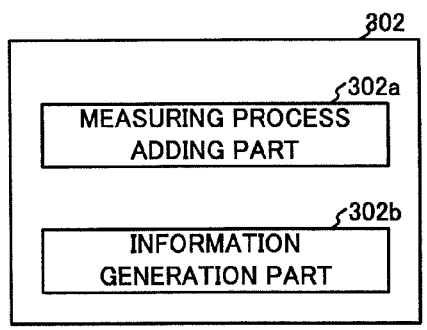
FIG. 5B is a diagram illustrating an exemplary configuration of an automatic generation part.

When execution of the automatic program generating process in FIG. 7 starts, in order to measure changes in the operating program being executed and the task being executed at a given period, for example, the measuring process adding part 302a of the automatic generation part 302 illustrated in FIG. 5B generates source code for a measuring program executed irrespectively of the order displayed on the program assembly screen FA in FIG. 6 (in other words, a measuring program that operates by timer interrupts) by using the source code of a timer interrupt measuring component program, for example, and outputs the generated source code by adding the generated source code to the source file (step S11). Note that the code added in step S11 includes code expressing a measuring process such as that from step S45 to S50 in FIG. 8 to be discussed later.

After step S11 in FIG. 7, the automatic generation part 302 starts outputting the source code of the program assembled by the program assembling part 301 to the source file (step S12). Specifically, the automatic generation part 302 processes the multiple block displays arranged on the program assembly screen FA in FIG. 6 in order starting from the block display displayed at a position close to the start of the process (in other words, on the left side of the screen), and starts outputting the source code of the component program expressed by the block display being processed to the source file.

Next, the automatic generation part 302 determines whether the component program with source code to output is an operating component program or a measuring component program (step S13). At this point, if the component program is determined to be an operating component program (step S13; Yes), the automatic generation part 302 searches the terminal storage 303 in FIG. 5A for the source code of the operating component program to output, and outputs the source code found by search by adding (in other words, appending) the searched source code to the source file (step S14). Note that the code added in step S14 may also include code expressing a process like that from step S42 to S44 in FIG. 8 to be discussed later.

In contrast, upon determining that the component program is a measuring component program (step S13; No), the measuring process adding part 302a searches for source code similarly to step S14, outputs the source code of the measuring component program found by search by adding the searched source code to the source file of the measuring program, and adds the source code for a measuring program call process to the source file of the operating program as necessary (step S15). Note that the code added in step S15 includes code expressing a measuring process like that from step S44 to S50 in FIG. 8 to be discussed later, similarly to the code added in step S11.

After executing step S14 or step S15, the automatic generation part 302 determines whether or not all source code for the component programs assembled into the program have been output (step S16). At this point, the automatic generation part 302 repeats the above process from the above step S13 upon determining that not all source code has been output yet (step S16; No). In contrast, upon determining that all source code has been output (step S16; Yes), the automatic generation part 302 pre-compiles the source code file to generate binary data (in other words, a binary program), and pre-links the generated binary program (step S17). At this point, in order for the control device 210 to execute the program to be generated, the automatic generation part 302 establishes a range in the control device 210 where the range of the stack area (hereinafter referred to as the stack range) and the program to be generated will be placed (hereinafter referred to as the program range).

Herein, the CPU 200a included in the remote 200 executes multiple operating programs for respective tasks in order according to task scheduling. At this point, the remote 200 executes the same program for multiple tasks in some cases. In such cases, although the same program is executed for each task, the stack area (hereinafter designated the stack area) used to execute the program differs. The stack area is a storage area in the RAM 200c in FIG. 2, and is an area that temporarily stores variables used for program execution when the CPU 200a executes a program in a task.

After step S17, the information generation part 302b of the automatic generation part 302 illustrated in FIG. 5B generates identification information for the demarcated stack area (hereinafter referred to as the stack ID), and then adds data expressing the generated stack ID as well as data expressing the start address and data expressing the end address of the stack area to a stack area list. After that, the automatic generation part 302 outputs the stack area list with the added data to an electronic file (hereinafter referred to as the stack area list file) (step S18).

Note that in the case where the address bus in the remote 200 has a bus width of 4 bytes, for example, the stack area list is a list capable of storing up to a maximum of 256 sequences of 10 bytes data formed as a set of 4 bytes data expressing the start address of the stack range, 4 bytes data expressing the end address of the stack range, and 2 bytes data expressing the stack 1D.

After step S18, the information generation part 302b generates identification information for the generated operating program (hereinafter referred to as the operating program ID), and then adds data expressing the generated program ID as well as data expressing the start address and data expressing the end address of the program range of the operating program to a program area list. After that, the automatic generation part 302 outputs the program area list with the added data to an electronic file (hereinafter referred to as the program area list file) (step S19).

Note that the program area list is a list capable of storing multiple sequences of 10 byte data formed as a set of 4 bytes data expressing the start address of the range where the program is placed, 4 bytes data expressing the end address of the range where the program is placed, and 2 bytes data expressing the operating program ID. Furthermore, the data expressing the start address and the data expressing the end address of the program area list as well as the data expressing the operating program ID are not necessarily required to be 4 bytes, 4 bytes, and 2 bytes, respectively.

After executing step S19, the automatic generation part 302 incorporating the stack area list file and the program area list file into the source to be compiled, and recompiles (step S20). With this process, the binary program generated in step S17 becomes able to reference the stack area and the program area list.

After step S20, the automatic generation part 302 saves information expressing the time constraint specified by the program assembling part 301 in association with the program ID of the generated operating program (in other words, the program with the imposed time constraint) in information storage 202, and then ends execution of the automatic program generating process.

After executing the process in step S03 of FIG. 4A, the signal output part 304 in FIG. 5A transmits the operating program generated in step S03, the measuring program called from the operating program, the program area list file, and the stack area list file referenced by the measuring program, as well as information specifying addresses where to save the above, to the remote 200 (step S04), and then ends execution of the program generating process.

Next, the remote 200 that receives a program transmitted from the terminal device 300 will be described.

Figure 4B:
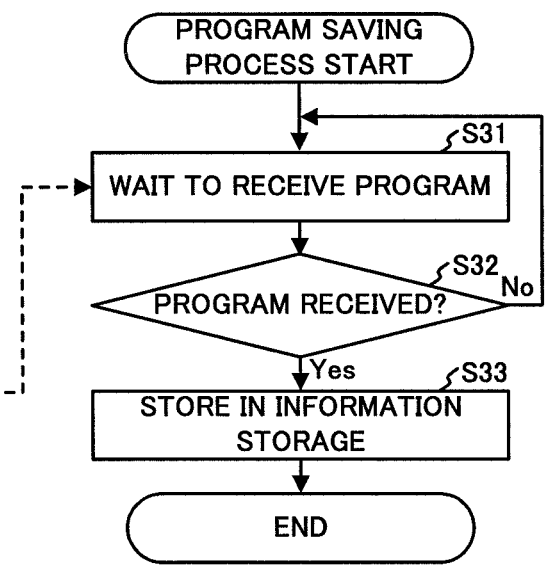
FIG. 4B is a flowchart illustrating an example of a program saving process executed by a remote control device.

The CPU 200a of the remote 200 illustrated in FIG. 2 uses the hardware illustrated in FIG. 2 to execute a program saving process like that illustrated in FIG. 4B, thereby realizing the signal input part 201 and the information storage 202 as illustrated in FIG. 5A.

Upon detecting a connection between the remote 200 and the terminal device 300, the signal input part 201 in FIG. 5A starts executing the program saving process in FIG. 4B. First, the signal input part 201 waits to receive a program over a given time (to receive a write command with instructions to write a program to the information storage 202, for example) (step S31), and then determines whether or not a program has been received (step S32). At this point, the signal input part 201 repeats the above process from step S31 in the case of determining that a program was not received (step S32; No). In contrast, in the case of determining that a program was received (step S32; Yes), the signal input part 201 receives an operating program, measuring program, program area list file, and stack area list file transferred from the terminal device 300, as well as information specifying addresses where to save the above, and saves these programs and files at addresses in the information storage 202 specified in the received information (step S33). After that, the signal input part 201 determines whether the contents of the saved programs and files are correct. At this point, the signal input part 201 ends execution of the program saving process upon determining that the contents are correct. In contrast, upon determining that the contents are incorrect, the signal input part 201 deletes the saved programs and files from the information storage 202, and then ends execution of the program saving process.

Figure 8:
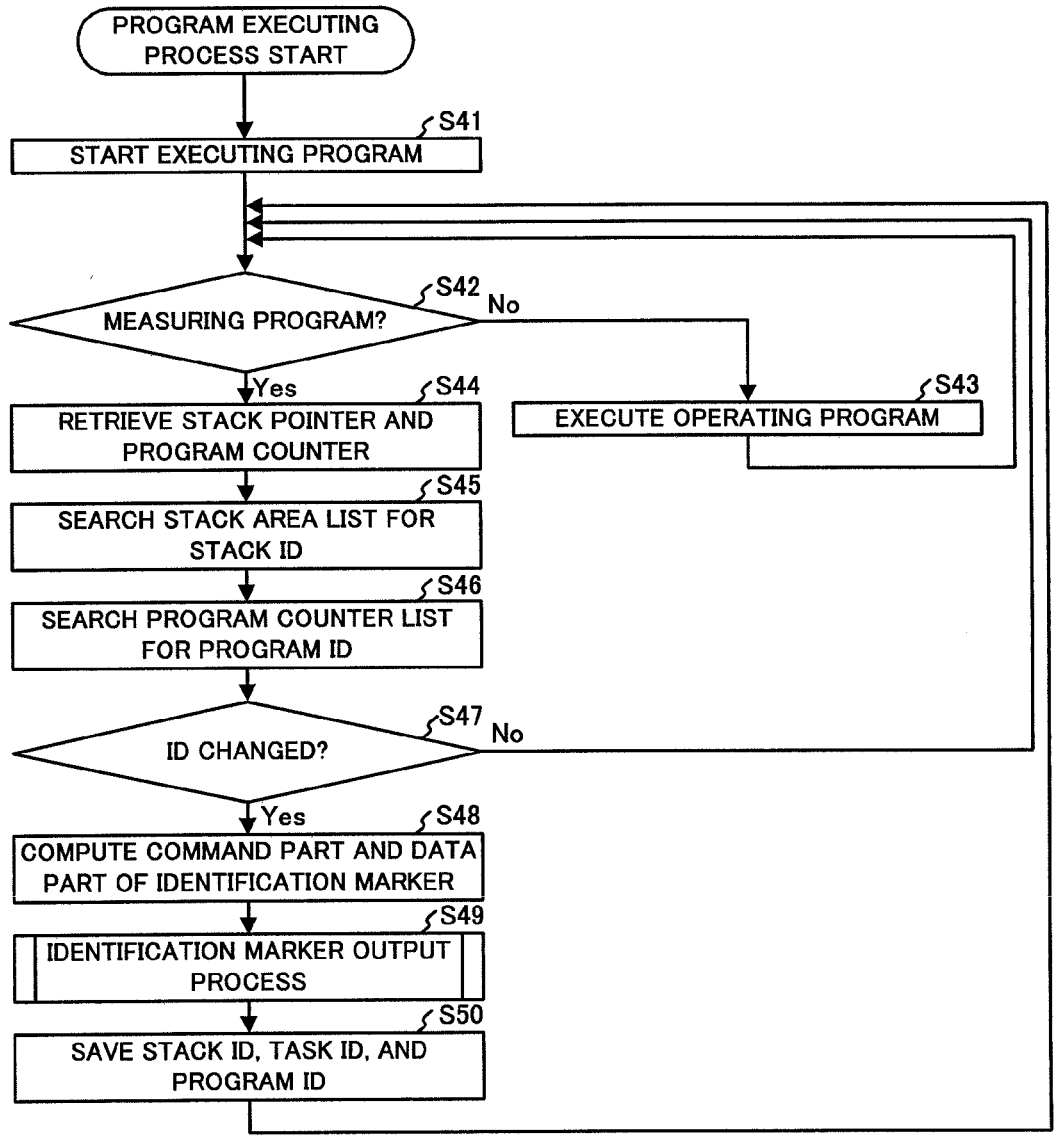
FIG. 8 is a flowchart illustrating an example of a program executing process executed by a remote control device.

At this point, when the remote 200 illustrated in FIG. 2 is powered on, the CPU 200a of the remote 200 starts a program executing process as illustrated in FIG. 8, which executes the operating program and the measuring program saved in the information storage 202. The CPU 200a uses the hardware illustrated in FIG. 2 to execute this program executing process, thereby realizing the execution part 203, the timer 204, the signal output part 205, the communication part 208, and the operation display 209 as illustrated in FIG. 5A.

Upon starting the program executing process in FIG. 8, the execution part 203 in FIG. 5A starts executing the operating program stored in the information storage 202, as well as the measuring program embedded in the operating program (step S41). Specifically, the execution part 203 activates multiple operating programs stored in the information storage 202 for individual tasks, such as a control program, a communication program, and a display program. At this point, the execution part 203 determines the stack area used to execute the operating program for an activated task according to the start address and end address stated in the stack area list which is stored in the information storage 202. Next, the execution part 203 saves the stack ID of the determined stack area in association with the task ID of the task in the information storage 202. After that, the execution part 203 executes the operating program for each task in a given order according to time scheduling (hereinafter referred to as executing tasks).

After step S41, the execution part 203 determines whether or not the program to execute next is the measuring program (step S42). Note that the execution part 203 executes the measuring program in the case where the timer 204 produces a timer event at a given period, or in the case where a program counter reaches a position that was specified by the user of the terminal device 300 during program assembly.

Upon determining in step S42 that the program to execute next is not the measuring program (step S42; No), the execution part 203 executes the operating program (step S43). Specifically, the execution part 203 controls operation of the remote 200, controls the communication part 208 to transmit commands for controlling operation of the air conditioning device 100, and controls the operation display 209 to display information such as communication results, control results, and operating state quantities for the air conditioning device 100. After that, the execution part 203 returns to step S42 and repeats the above process.

Upon determining in step S42 that the program to execute next is the measuring program (step S42; Yes), the execution part 203 retrieves the value of a stack pointer register and the value of a program counter register in the CPU 200a, and saves the retrieved values in the information storage 202 (step S44). Note that the program counter register indicates the position of a program command being executed by the CPU 200a. When the CPU 200a executes the command at the position indicated by the program counter register, the value of the program counter register is incremented by a value of 1.

Next, the execution part 203 executes the process from step S45 to S50 according to the measuring program. In step S45, the execution part 203 searches the stack area list stored in the information storage 202 for the stack ID of a stack area whose start address comes before the stack pointer register value saved in the information storage 202, and whose end address comes after the stack pointer register value (step S45). After that, the execution part 203 searches for the task ID stored in the information storage 202 in association with the stack ID.

After that, the execution part 203 searches the program area list stored in the information storage 202 for the program ID of a program area whose start address comes before the program counter register value saved in the information storage 202, and whose end address comes after the program counter register value (step S46).

The execution part 203 determines whether or not the stack area used to execute the program has changed, on the basis of the stack ID already saved in the information storage 202 in a step S50 to be discussed later and the stack ID searched in step S45, and also determines whether or not the program being executed has changed, on the basis of the program ID saved in a step S50 to be discussed later and the program ID searched in step S46 (step S47).

Upon determining in step S47 that neither the stack area being used nor the program being executed have changed (step S47; No), the execution part 203 returns to step S42 and repeats the above process. In contrast, upon determining that the stack area being used or the program being executed has changed (step S47; Yes), the execution part 203 computes the values of the command part and the data part of an identification marker as illustrated in FIG. 9A (step S48).

The identification marker herein refers to a marker which is assigned to a signal and which identifies a program or task whose execution state has changed, while also expressing the changed execution state. Specifically, the identification marker is an asynchronous communication signal made up of a bit sequence. The identification marker includes the task start command, the task end command, the program start command, and the program end command, as illustrated in FIG. 9A. These commands are 2 bytes (in other words, 16 bits) bit sequences made up of a command part and a data part which are 1 byte each. A bit sequence is expressed by binary voltage levels having a High level and a Low level.

Figures 9A, 9B:
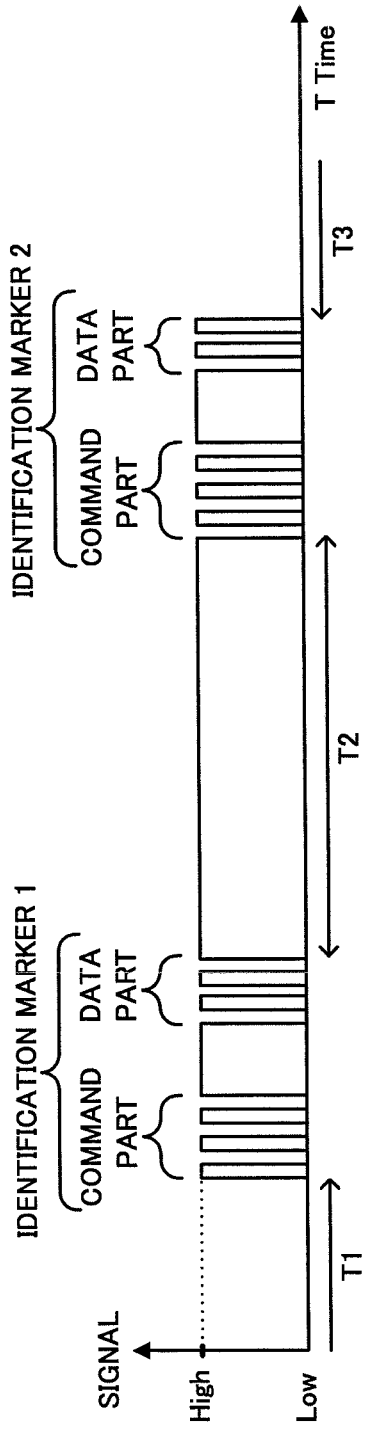
FIG. 9A is a diagram illustrating an example of command part and a data part constituting an identification marker.
FIG. 9B is a diagram illustrating an example of a signal output by a remote control device.

As illustrated in FIG. 9A, the task start command is made up of a command part "0x01" indicating that execution of a task has started, and a data part expressing the task ID of the task that has entered the execution start state. Similarly, the task end command is made up of a command part "0x02" indicating that execution of a task has ended, and a data part expressing the task ID of the task that has entered the execution end state. In addition, the program start command is made up of a command part "0x03" indicating that execution of a program has started, and a data part expressing the program ID of the program that has entered the execution start state. Similarly, the program end command is made up of a command part "0x04" indicating that execution of a program has ended, and a data part expressing the program ID of the program that has entered the execution end state.

In other words, upon determining that the stack area being used has changed (see step S47; Yes), in step S48 the execution part 203 generates a task start command made up of the command part "0x01" and a data part expressing the task ID of the task executed using the stack identified by the stack ID searched in step S45, and also generates a identification marker made up of a command part "0x02" and a data part expressing the task ID saved in step S50 (in other words, a task end command). Similarly, upon determining that the program being executed has changed, the execution part 203 generates a program start command made up of the command part "0x03" and a data part expressing the program ID searched in step S46, and also generates a program end command made up of a command part "0x04" and a data part expressing the program ID saved in step S50.

After step S48, the execution part 203 adds the identification markers (in other words, commands) to a transmit queue, and then instructs the signal output part 205 to output the identification markers buffered in the transmit queue. After that, the signal output part 205 executes an identification marker output process as illustrated in FIG. 10, according to instructions from the execution part 203 (step S49).

Upon starting the identification marker output process in FIG. 10, the signal output part 205 stores the current output signal level (step S61). Next, the signal output part 205 sets the signal level of the output signal to the Low level (step S62). After that, the signal output part 205 retrieves a single identification marker being stored in the transmit queue, outputs the command part (8 bits) of the retrieved identification marker sequentially from the first bit to the eighth bit (step S63), and then outputs the data part (8 bits) of the identification marker sequentially from the first bit to the eighth bit (step S64). Next, the signal output part 205 determines whether or not an identification marker remains in the transmit queue (step S65), and upon determining that an identification marker does remain (step S65; Yes), returns to step S63 and repeats the above process.

In contrast, upon determining that no identification markers remain in the transmit queue (step S65; No), the signal output part 205 starts signal output at the inverse level of the signal level that was saved to the information storage 202 in step S61 (step S66), and then ends execution of the identification marker output process.

As a specific example, during a time T2 after outputting an identification marker 1 but before outputting an identification marker 2 as illustrated in FIG. 9B, the signal output part 205 outputs a signal at the High level, the inverse of the Low signal level during a time T1 prior to outputting the identification marker 1. Also, during a time T3 after outputting the identification marker 2 but before outputting the next identification marker, the signal output part 205 outputs a signal at the Low level, the inverse of the High signal level during the time T2.

According to these configurations, a signal expressing identification information for an operating program or task such as the data part, for example (in other words, a program ID or task ID), is output after outputting a signal value at a given level, and then a signal at the inverse level of the given level is output after the transmission of the signal expressing the identification information is finished. For this reason, the amount of time between a change in the execution state of an operating program or task and the next change in the execution state (in other words, the execution time of the operating program or task) is easily measurable by the signal value inversion using a oscilloscope, for example. Also, since identification information for an operating program (in other words, the program ID) is expressed by signal values at a given level and signal values which are the inverse of the given signal values, ascertaining the execution state of an operating program or task does not require a specialized decoder for the output signal, unlike the case of outputting a task dispatch log using asynchronous communication such as Universal Asynchronous Receiver/Transmitter (UART). Furthermore, there is better response and less influence on the execution of an operating program compared to the case of using UART.

After step S49 in FIG. 8, the execution part 203 saves the stack ID, task ID, and program ID respectively searched in steps S45 and S46 to the information storage 202 (step S50), and then repeats the above process from step S42.

Figure 11:
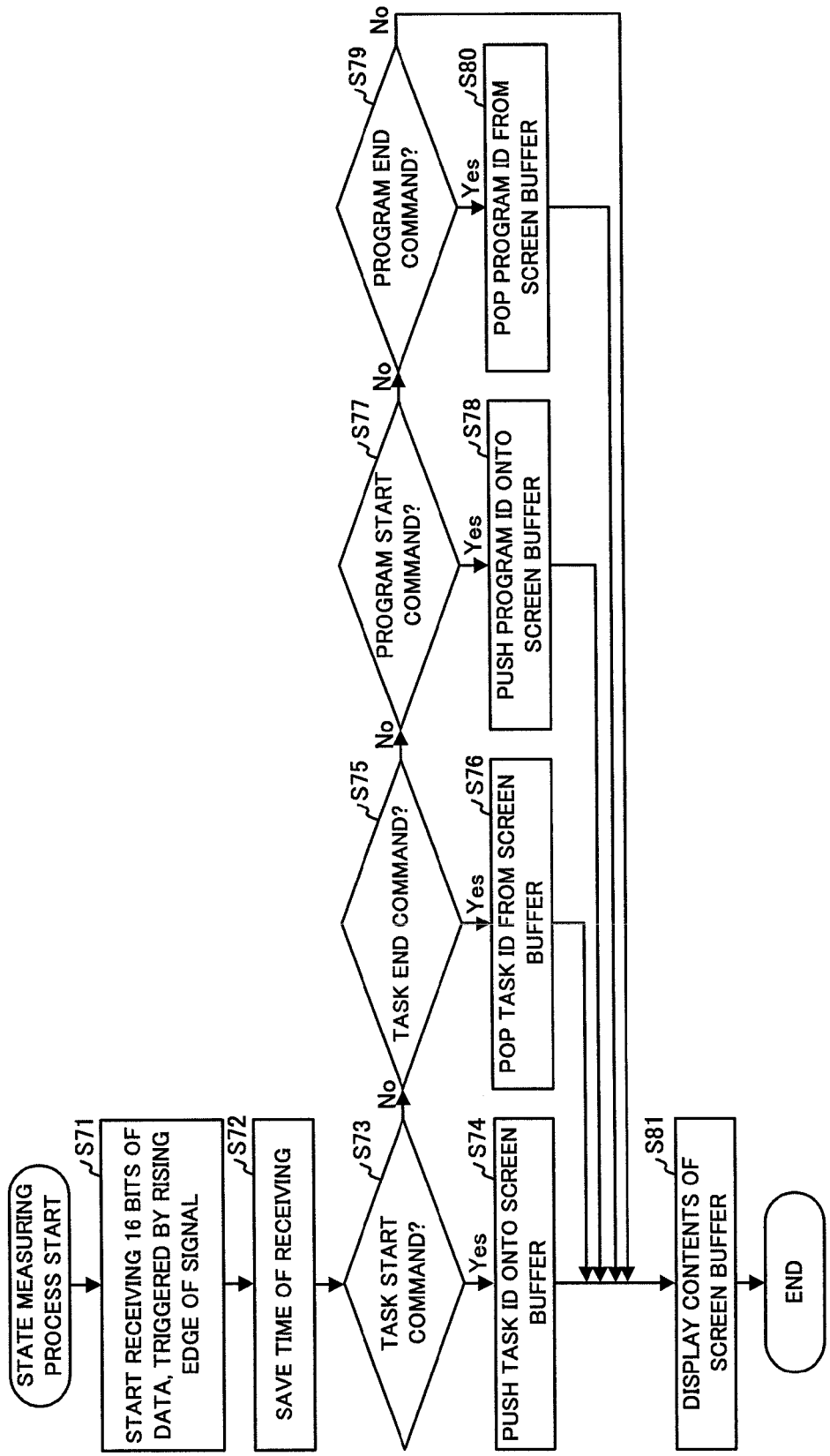
FIG. 11 is a flowchart illustrating an example of a state measuring process executed by a terminal device.

The CPU 300a of the terminal device 300 that receives a signal output from the remote 200 uses the hardware illustrated in FIG. 2 to execute a state measuring process as illustrated in FIG. 11, thereby functioning as the signal input part 307, the measuring part 308, and the results display 309 as illustrated in FIG. 5A.

The signal input part 307 starts executing the state measuring process in FIG. 11 when triggered by the rising edge of a signal output from the remote 200. The signal input part 307 first receives 16 bits of data (step S71). Next, the signal input part 307 saves the received data (in other words, an identification marker) in the information storage 202, in association with information expressing the time of receiving the data (step S72).

Next, the measuring part 308 determines whether or not the saved data is a task start command (step S73). Specifically, the measuring part 308 determines whether or not the command part of the saved data is the command part "0x01" of a task start command as illustrated in FIG. 9A. Upon determining at this point that the saved data is a task start command (step S73; Yes), the measuring part 308 extracts the data part expressing a task ID from the saved data, and pushes the task ID expressed by the extracted data part onto a stack variable for tasks in a screen buffer demarcated in the information storage 202 (step S74). The measuring part 308 also changes the value of a variable in the screen buffer that expresses the state of the task identified by the task ID to a value expressing the running state in which the task is being executed.

Upon determining in step S73 that the saved data is not a task start command (step S73; No), the measuring part 308 determines whether or not the saved data is a task end command (step S75). Specifically, the measuring part 308 determines whether or not the command part of the saved data is the command part "0x02" of a task end command as illustrated in FIG. 9A. Upon determining at this point that the saved data is a task end command (step S75; Yes), the measuring part 308 extracts the data part expressing a task ID from the saved data, and then pops the task ID expressed by the extracted data part from the stack variable for tasks (step S76). The measuring part 308 also modifies the value of the variable expressing the state of the task identified by the task ID to a value expressing the standby state in which execution of the task is on standby.

Upon determining in step S75 that the saved data is not a task end command (step S75; No), the measuring part 308 determines whether or not the saved data is a program start command (step S77). Specifically, the measuring part 308 determines whether or not the command part of the saved data is the command part "0x03" of a program start command as illustrated in FIG. 9A. Upon determining at this point that the saved data is a program start command (step S77; Yes), the measuring part 308 extracts the data part expressing a program ID from the saved data, and then pushes the program ID expressed by the extracted data part onto a stack variable for programs in the screen buffer (step S78). The measuring part 308 also modifies the value of a variable expressing the state of the operating program identified by the program ID to a value expressing the running state in which the program is being executed.

Upon determining in step S77 that the saved data is not a program start command (step S77; No), the measuring part 308 determines whether or not the saved data is a program end command (step S79). Specifically, the measuring part 308 determines whether or not the command part of the saved data is the command part "0x04" of a program end command as illustrated in FIG. 9A. Upon determining at this point that the saved data is a program end command (step S79; Yes), the measuring part 308 extracts the data part expressing a program ID from the saved data, and then pops the program ID expressed by the extracted data part from the stack variable for programs (step S80). The measuring part 308 also modifies the value of a variable expressing the state of the operating program identified by the program ID to a value expressing the standby state in which the execution of the program is on standby.

After step S74, step S76, step S78, or step S80, the measuring part 308 controls the results display 309 to display the changes in the value of the variable expressing the task state in the screen buffer and the value of the variable expressing the operating program state in association with the times when these variable values changed (in other words, the time of receiving the commands saved to the information storage 202) (step S81). After that, the measuring part 308 ends execution of the state measuring process.

Figure 12A:
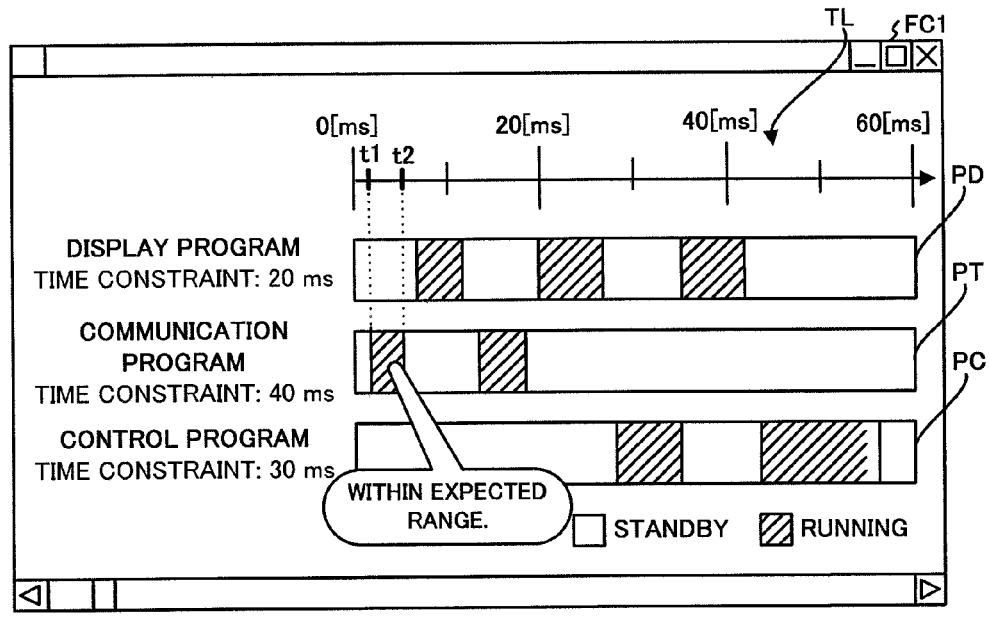
FIG. 12A is a diagram illustrating an example of a results display screen displayed by a terminal device.

Specifically, in step S81, the results display 309 displays a results display screen FC1 as illustrated in FIG. 12A. The results display screen FC1 displays a timeline TL expressing the execution times of operating programs, a display block PD expressing the execution state of the display program, a display block PT expressing the execution state of the communication program, and a display block PC expressing the execution state of the control program.

A specific example will now be described, taking the case where the signal input part 307 accepts a program start command having a data part expressing the program ID of the communication program as input at a time t1, and accepts a program end command having a data part expressing the program ID of the communication program as input at a time t2. The results display 309 switches the display of the display block PT expressing the execution state of the communication program to a display expressing the running state starting at time t1, and switches the display of the display block PT to a display expressing the standby state starting at the time t2.

After that, the measuring part 308 searches for information expressing the time constraint stored in the information storage 202 in association with the program ID of the communication program, and displays the time constraint expressed by the searched information in association with the program name or the program ID of the communication program. The measuring part 308 also measures (in other words, determines) whether or not the time constraint expressed by the searched information is shorter than the amount of time from the time t1 to the time t2 (in other words, the execution time of the communication program) by a given amount of time or more. Upon measuring that the execution time of the communication program is shorter than the time constraint by a given amount of time or more, the measuring part 308 displays a message indicating that the execution time was shorter than the time constraint, such as "Within expected range.", for example. In contrast, upon measuring that the execution time of the communication program is longer than the time constraint by a given amount of time or more, the measuring part 308 displays a warning message or an error message indicating that the execution time was longer than the time constraint, such as "Outside expected range.", for example. Additionally, upon measuring that the difference between the time constraint and the execution time of the communication program is shorter than a given amount of time, the measuring part 308 displays a message indicating that the time constraint and the execution time approximately match, such as "Same as expected.", for example.

Figure 12B:
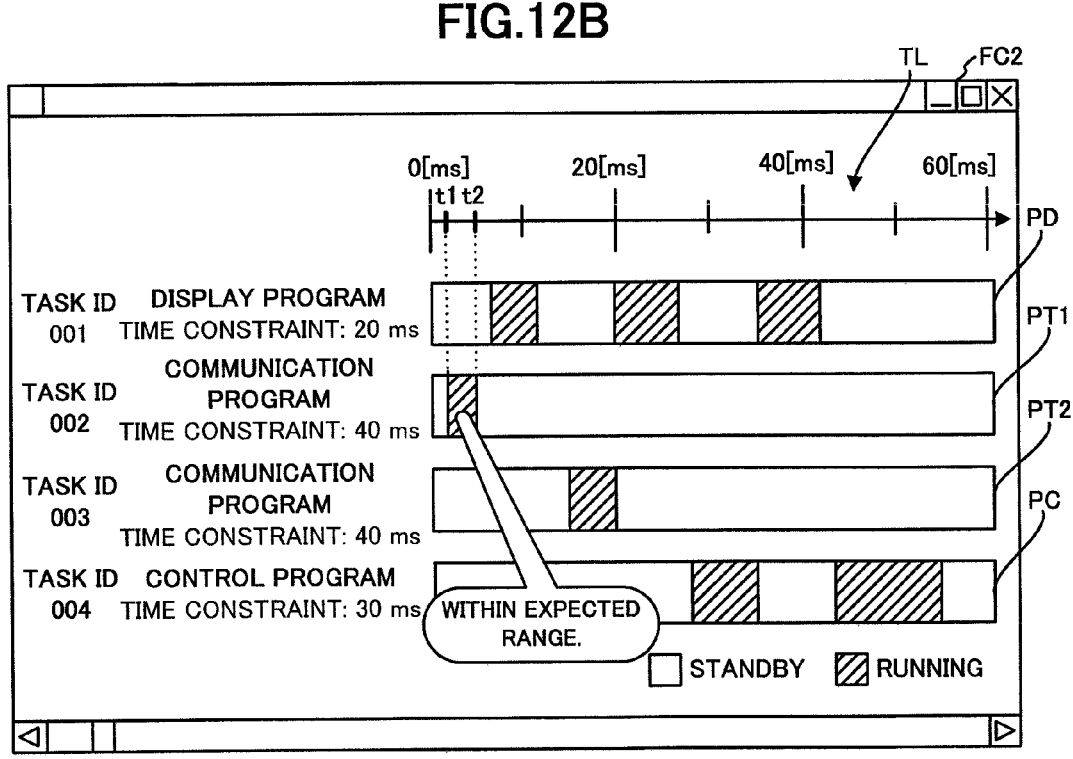
FIG. 12B is a diagram illustrating another example of a results display screen displayed by a terminal device.

Furthermore, in the case where the operating program identified by the same program ID is being multiply executed by the remote 200, the results display 309 displays a results display screen FC2 as illustrated in FIG. 12B. The results display screen FC2 in FIG. 12B displays multiple instances of a program ID identifying an operating program being executed in association with the task ID of the task that executes that operating program. Specifically, in the remote 200, the communication program identified by the same program ID is being executed in parallel by two tasks in order to communicate data that is respectively communicated on two communication ports. For this reason, the results display screen FC2 in FIG. 12B displays a timeline TL, a display block PT1 expressing the execution state of the communication program being executed by the task identified by the task ID "002", and a display block PT2 expressing the execution state of the communication program being executed by the task identified by the task ID "003". Also, the name of the program whose execution state is expressed in the display block PT1 is displayed in association with the task ID identifying the task executing that program on the left side of the display block PT1 on the screen. Similarly, the name of the program whose execution state is expressed in the display block PT2 is displayed in association with the task ID identifying the task executing that program on the left side of the display block PT2.

For this reason, when the signal input part 307 accepts a program start command and a task start command as input, the results display 309 switches the display of the display block expressing the execution state of the program being executed by the task identified by the task ID expressed in the data part of the task start command to a display expressing the running state in the display block expressing the execution state of the program identified by the program ID in the program start command. Note that the results display 309 may also display a display block and the names and program IDs of one or more programs whose execution states are expressed by the display block, in association with the task ID of the task in which the programs are executed.

Similarly, when the signal input part 307 accepts a program end command and a task end command as input, the results display 309 switches the display of the display block expressing the execution state of the program being executed by the task identified by the task ID expressed in the data part of the task end command to a display expressing the standby state in the display block expressing the execution state of the program identified by the program ID in the program end command.

According to these configurations, there is displayed the name of an operating program, the execution time of the operating program computed on the basis of the time of receiving a program start command, for example, and the time constraint imposed on the execution time of the operating program. More particularly, the display indicates whether or not the computed execution time of the operating program exceeds the time constraint imposed on the execution time of that operating program. For this reason, the user is able to easily investigate whether or not the execution time of an operating program executed in a remote control device 200 demanding real time performance satisfies a time constraint.

Also, according to these configurations, an operating program executed by a remote control device 200 is specified on the basis of program area specifying information such as a program area list that specifies where an operating program is placed, and a program counter value used to execute an operating program. For this reason, since there is little additional measuring processing on an operating program, a measuring program that measures the execution state of an operating program is generated while reducing the effect on the operation of the operating program.

Furthermore, according to these configurations, a task executed by a remote control device 200 is specified on the basis of stack area specifying information such as a stack area list that specifies a stack area, and a stack pointer value indicating a stack area used to execute an operating program. For this reason, a measuring program that measures the execution state of a task used to execute software while reducing the effect on the operation of an operating program is generated.

Moreover, according to these configurations, there is displayed identification information for a task (in other words, a task ID), the name of an operating program being executed by that task, and the time of receiving start state information which expresses that the execution state of the task is the execution start state. For this reason, the user is able to easily investigate the times when the operating programs in respective tasks enter the execution start state, even when the remote 200 executes the same operating program in multiple tasks.

Note that while a terminal device 300 pre-equipped with a configuration for realizing the functionality according to the present embodiment may be provided, an existing terminal device may also be made to function as a program generating device according to the present embodiment by applying a program. In other words, by applying a control program for realizing the respective functional components with the terminal device 300 illustrated by way of example in the foregoing embodiment such that the control program is executable by a computer (such as a CPU) that controls an existing terminal device, the existing terminal device is made to function as a terminal device 300 according to the present embodiment.

The distribution method for such a program is arbitrary, and besides being distributed by being stored on a recording medium such as a memory card, CD-ROM or DVD-ROM, the program may also be distributed via a communication medium such as the Internet. Note also that the program generating method of the present invention may be carried out using the terminal device 300.

Additionally, in cases such as the case where an Operating System (OS) contributes to realizing the functionality discussed above or the case where an OS and an application cooperatively realize the functionality discussed above, only the non-OS portions may be stored on a medium and distributed, or alternatively, downloaded or the like.

The present invention may also be subject to various embodiments and modifications without departing from the broad scope and spirit of the present invention. Furthermore, the embodiment discussed above is for describing the present invention, and does not limit the scope of the present invention. In other words, the scope of the present invention is indicated by the claims rather than the embodiment. In addition, various modifications performed within the scope of the claims or their equivalents are to be considered as being within the scope of the present invention.

This application is based on Japanese Patent Application No. 2010-263519 filed in the Japan Patent Office on Nov. 26, 2010, the entire contents of which, including specification, claims, and drawings, are hereby incorporated by reference.

INDUSTRIAL APPLICABILITY

The present invention applies to a program generating device that generates a measuring program which measures the execution states of operating programs executed in parallel by a controller, in a program generating device that generates a measuring program which measures the execution state of an operating program executed by a controller that controls equipment such as air conditioners and lighting.

REFERENCE SIGNS LIST

1 Execution state measuring system
100 Air conditioning device
200 Remote control device (remote)
200a CPU
200b ROM
200c RAM
200d Flash memory
200f Communication circuit
200g Video card
200h LCD
200i Operable keys
201 Signal input part
202 Information storage
203 Execution part
204 Timer
205 Signal output part
208 Communication part
209 Operation display
300 Terminal device
300a CPU
300b ROM
300c RAM
300d Hard disk
300e Media controller
300f Communication circuit
300g Video card
300h LCD
300i Keyboard
300j Speaker
300k Mouse
301 Program assembling part
302 Automatic generation part
302a Measuring process adding part
302b Information generation part
303 Terminal storage
304 Signal output part
307 Signal input part
308 Measuring part
309 Results display

The invention claimed is:

1. A program generating method, comprising:
an information generating step, performed by a processor, that generates a plurality of information that includes: identifying information that identifies an operating program executed by a controller that controls equipment, and program area specifying information that specifies a placement area of the operating program; and
a measuring process adding step, performed by the processor, that adds a program specifying process that specifies the operating program executed by the controller, on the basis of the program area specifying information included in the plurality of information generated in the information generating step and a program counter value of the controller, and an identification information transmitting process that transmits identification information identifying the specified operating program to a measuring program that measures the execution state of the operating program, wherein
in the identification information transmitting process, after a signal value at a given level is output, a signal expressing identification information for the specified operating program is output with signal values at the given level and signal values which are the inverse of the signal values at the given level, and a signal inverting the given level is output after the signal expressing the identification information finishes transmitting.

2. A computer-readable non-transitory recording medium having stored therein a program generating program causing a computer to function as:
an information generator generating a plurality of information that includes: identifying information that identifies an operating program executed by a controller that controls equipment, and program area specifying information that specifies a placement area of the operating program; and
a measuring process adder adding a program specifying process that specifies the operating program executed by the controller, on the basis of the program area specifying information included in the plurality of information generated by the information generator and a program counter value of the controller, and an identification information transmitting process that transmits identification information identifying the specified operating program to a measuring program that measures the execution state of the operating program, wherein in the identification information transmitting process, after a signal value at a given level is output, a signal expressing identification information for the specified operating program is output with signal values at the given level and signal values which are the inverse of the signal values at the given level, and a signal inverting the given level is output after the signal expressing the identification information finishes transmitting.

3. A program generating device, comprising:
a processor; and
a memory that stores instructions that, when executed, cause the processor to, generate, by an information generator, a plurality of information that includes: identifying information that identifies an operating program executed by a controller that controls equipment, and a program area specifying information that specifies a placement area of the operating program; and add, by a measuring process adder, a program specifying process that specifies the operating program executed by the controller, on the basis of the program area specifying information included in the plurality of information generated by the information generator and a program counter value of the controller, and an identification information transmitting process that transmits identification information identifying the specified operating program to a measuring program that measures the execution state of the operating program, wherein in the identification information transmitting process, after a signal value at a given level is output, a signal expressing identification information for the specified operating program is output with signal values at the given level and signal values which are the inverse of the signal values at the given level, and a signal inverting the given level is output after the signal expressing the identification information finishes transmitting.

4. The program generating device according to claim 3, wherein,
in the case where the identification information for the specified operating program changes, in the identification information transmitting process the changed identification information and start state information expressing that the execution state of the operating program identified by the changed identification information is an execution start state is additionally transmitted.

5. The program generating device according to claim 4, wherein,
the information generator additionally generates stack area specifying information that specifies a stack area used by the controller to execute the operating program,
the measuring process adder additionally adds a task specifying process that specifies a task executed by the controller using the stack area to the measuring program, on the basis of the stack area specifying information generated by the information generator and the stack pointer value of the controller,
the controller executes the operating program in parallel in a plurality of tasks by using respectively different stack areas, and
in the case where the identification information for the specified task changes, in the identification information transmitting process, the changed identification information and start state information expressing that the execution state of the operating program in the task identified by the changed identification information is an execution start state is additionally transmitted.

6. The program generating device according to claim 5, further comprising:
a communicator receiving the identification information for the operating program executed by the controller and the start state information from the controller; and
a display displaying the program name of the operating program identified by the identification information received by the communicator, an execution time of the operating program computed on the basis of the time of receiving the start state information, and a time constraint imposed on the execution time of the operating program.

7. The program generating device according to claim 6, further comprising:
a measurer measuring whether or not the computed execution time of the operating program exceeds the time constraint imposed on the execution time of the operating program,
wherein the display additionally displays the result measured by the measurer.

8. The program generating device according to claim 6, wherein
the communicator receives the identification information for the task executed by the controller and the start state information from the controller, and
the display displays the identification information for the task identified by the identification information received by the communicator, the program name of the operating program executed in the task and the time of receiving the start state information in association with each other.

9. The program generating device according to claim 7, wherein
the communicator receives the identification information for the task executed by the controller and the start state information from the controller, and
the display displays the identification information for the task identified by the identification information received by the communicator, the program name of the operating program executed in the task and the time of receiving the start state information in association with each other.

* * * * *